C. SORENSEN.
VALVE FOR MILKING MACHINES.
APPLICATION FILED OCT. 28, 1911.
1,109,800.
Patented Sept. 8, 1914.
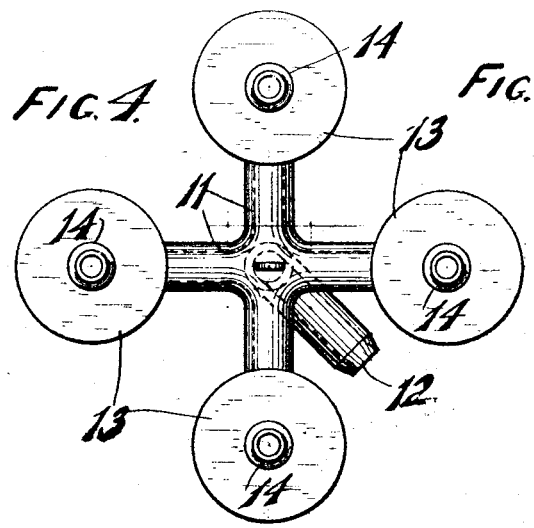
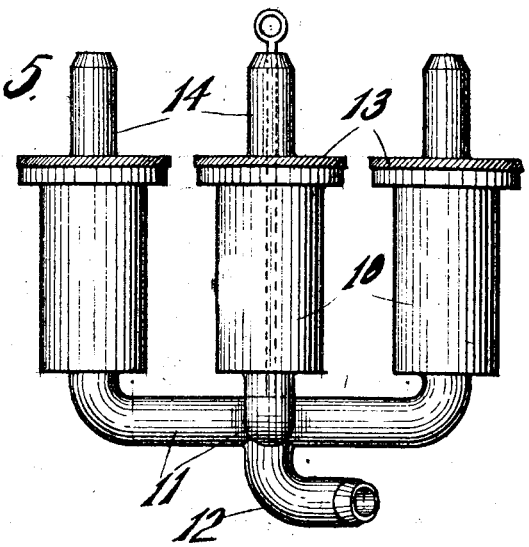
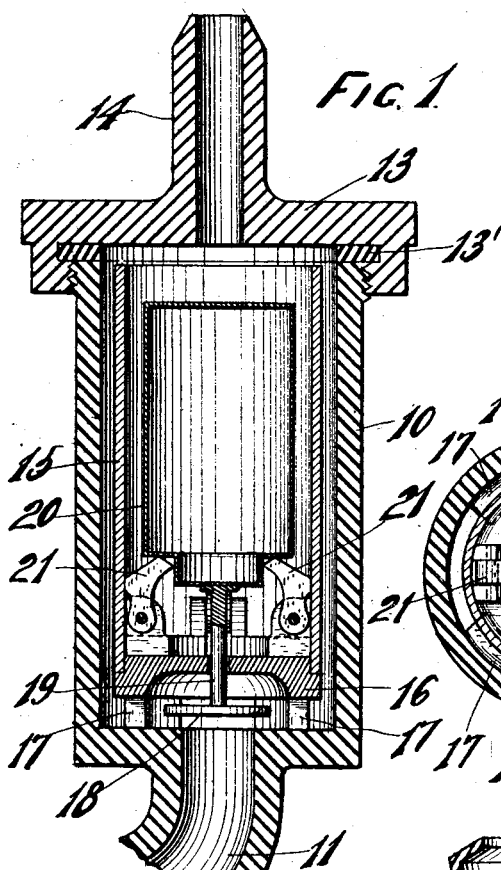
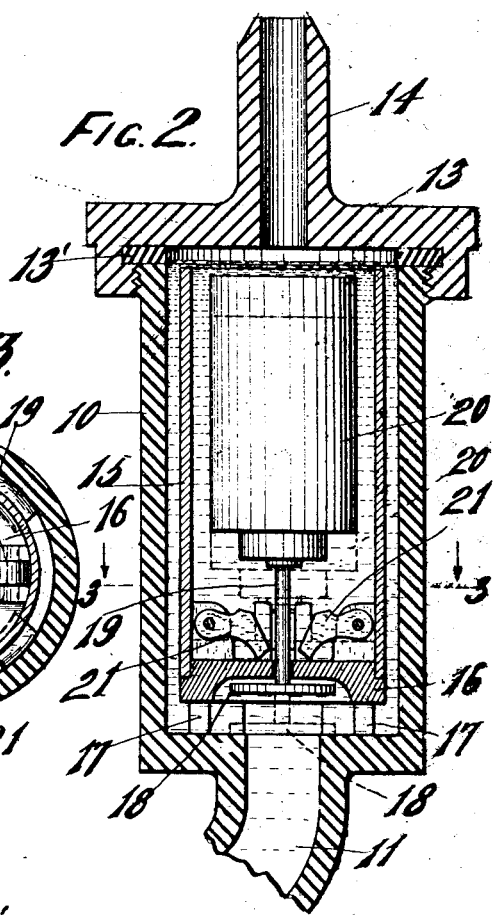
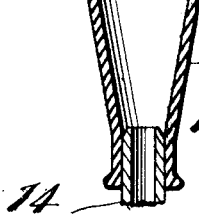
WITNESSES
INVENTOR
Carl Sorensen
By Morsell & Caldwell
ATTORNEYS

UNITED STATES PATENT OFFICE.

CARL SORENSEN, OF RACINE, WISCONSIN, ASSIGNOR OF ONE-HALF TO ANDREW JOHNSON, OF RACINE, WISCONSIN.

VALVE FOR MILKING-MACHINES.

1,109,800.  Specification of Letters Patent.  Patented Sept. 8, 1914.

Application filed October 28, 1911. Serial No. 657,293.

*To all whom it may concern:*

Be it known that I, CARL SORENSEN, a subject of the King of Denmark, and resident of Racine, in the county of Racine and State of Wisconsin, have invented new and useful Improvements in Valves for Milking-Machines, of which the following is a description, reference being had to the accompanying drawings, which are a part of this specification.

This invention relates to a valve for milking machines in which the milking is done by suction and has for its object to provide an automatic valve for each teat connection which will close the connection from the suction when the milk ceases to flow from the teat.

Another object of the invention is to perfect details of construction of such automatic valve.

With the above and other objects in view the invention consists in the valve for milking machines herein claimed and all equivalents.

Referring to the accompanying drawings in which like characters of reference indicate the same parts in the different views: Figure 1 is a sectional elevation of one of the valve mechanisms constructed in accordance with this invention, the valve being shown in position for use; Fig. 2 is a similar view thereof with the valve in the position assumed by it during use, and shown in dotted lines in its closed position; Fig. 3 is a sectional plan view thereof on the plane of line 3—3 of Fig. 2; Fig. 4 is a plan view of the set of valve mechanisms; Fig. 5 is an elevation thereof and, Fig. 6 is a sectional view of one of the teat connections.

In these drawings 10 indicates a cylindrical valve casing having a pipe 11 leading therefrom to connect it in common with the other valve casings of the set to the suction pipe connection 12 connected with any suitable mechanism for creating suction. The valve casing 10 is closed by the screw cover 13 with a central nipple 14 to receive the usual soft rubber teat connection 14' shown in Fig. 6. The closure between the valve casing and the cover 13 is made air tight by means of a gasket 13'. In the valve casing 10 is a cylinder 15 seated on a shouldered base 16 which is spaced from the inner walls of the casing and elevated from the bottom of the casing by means of a number of legs or supporting blocks 17 which permit the milk overflowing the cylinder 15 to pass down through the space between the cylinder and the walls of the casing and then through the space between the supporting blocks to the pipe 11. The upper end of the pipe 11 forms a valve seat adapted to be engaged by a disk valve 18 which is mounted on a stem 19 passing through the base 16 and connects with a shouldered float 20 within the cylinder 15. The base 16 has upwardly extending lugs between which are pivotally mounted a series of gravity dogs 21 which are adapted to engage the shoulder of the float before the commencement of the milking operation to hold the valve 18 off of its seat.

In operation the device is inverted so that the weight of float 20 opens the valve 18 and the dogs 21 engage the shoulder of the float. Then the device is turned to its upright position and the several teat connections are made so that when the suction is started in the suction pipe the milk will enter the cylinder 15 and on filling the same will lift the float 20, releasing the dogs 21 which drop inwardly to the position shown in Fig. 2. The milk overflows the cylinder 15 and passes down the outside thereof into the pipe 11 from which it is taken through the connection 12 to the suction pipe. The operation continues, the suction pipe being effective for milking until the milk ceases to flow, whereupon the level of the milk in the cylinder 15 is lowered by the milk passing out through the opening in the base 16 around the valve stem 19 and the float 20 descends to close the valve 18 and thus shut off that particular valve casing from the suction of the machine. By this means each teat is automatically relieved from the suction operation as it becomes exhausted and the suction is confined to the others.

The device is so constructed that the inner parts are readily removable for cleaning.

What I claim as new and desire to secure by Letters Patent is:

1. An automatic valve for milking machines, comprising a valve casing provided with a valve seat and a teat connection, a cylinder within the valve casing with its upper end open and its lower end closed, a shouldered float within the cylinder, a stem connected to the float and passing through an opening in the bottom of the cylinder, a valve on the stem for closing the valve seat, and gravity dogs within the cylinder for engaging the float and initially holding the valve off of its seat and adapted to fall out of position for engagement with the float when the float is lifted by the milk contained within the cylinder.

2. An automatic valve for milking machines, comprising a valve casing having a valve seat and a teat connection, a base within the valve casing having an opening, spacing blocks on the base resting on the bottom of the valve casing for holding the base above the bottom of the valve casing and spaced from the walls of the valve casing, a cylinder mounted on the base with its upper end open, a shouldered float within the cylinder, a stem on the float passing through the opening in the base, a valve on the stem for closing the valve seat, lugs on the base, and gravity dogs pivoted between the lugs for initially engaging the shoulder of the float to hold the valve off of its seat and adapted to fall out of position for engagement with the float when the float is lifted by milk within the cylinder.

3. In a milking machine, a cluster of valve casings rigidly connected together and having a common suction connection, teat connections at the upper ends of the valve casings, a cylinder contained within each valve casing with its upper end open and its lower end closed, a shouldered float valve with its stem passing loosely through the closed lower end of the cylinder with its float contained within the cylinder for closing the suction connection in the bottom of the valve casing, and a plurality of gravity dogs surrounding the float valve and adapted to engage the shoulder thereof for holding the float valve in its open position, but adapted to fall out of position for engaging the float valve when the float valve is lifted by the presence of milk in the cylinder.

In testimony whereof, I affix my signature, in presence of two witnesses.

CARL SORENSEN.

Witnesses:
A. L. MORSELL,
M. S. EDMONDS.